Oct. 31, 1972    O. V. PUZIK    3,701,564
VEHICLE AXLE SPINDLE
Filed July 28, 1970    4 Sheets-Sheet 3
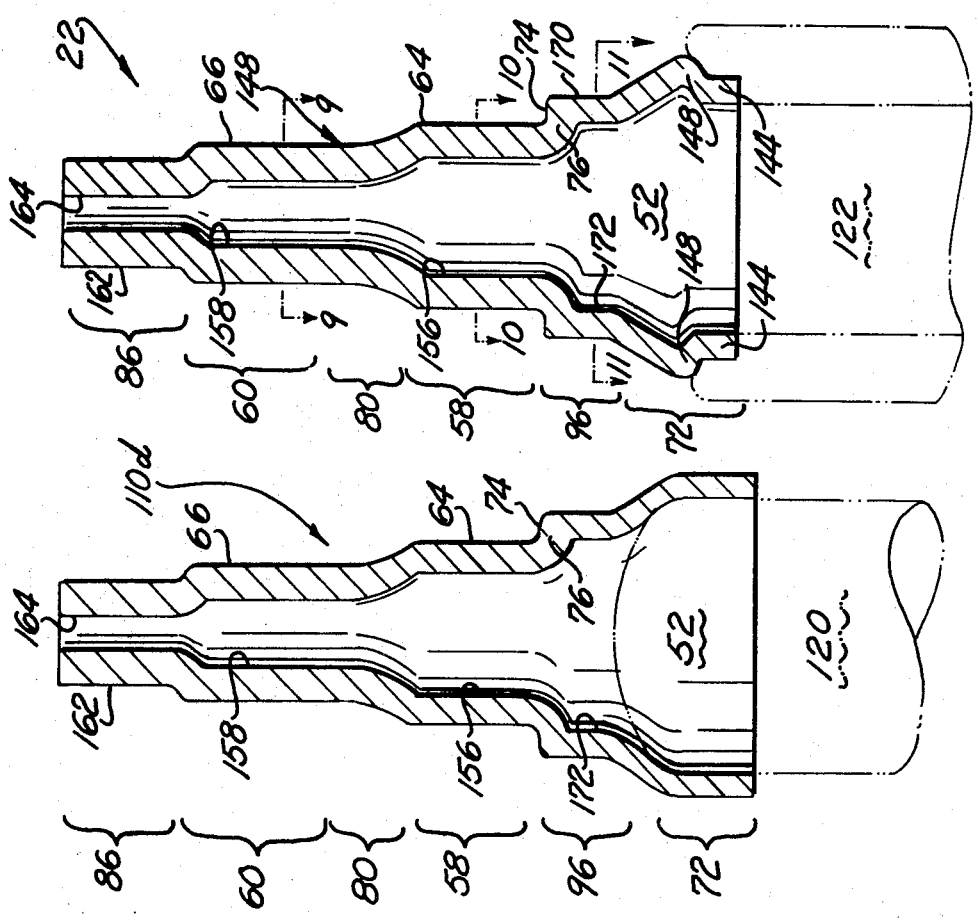
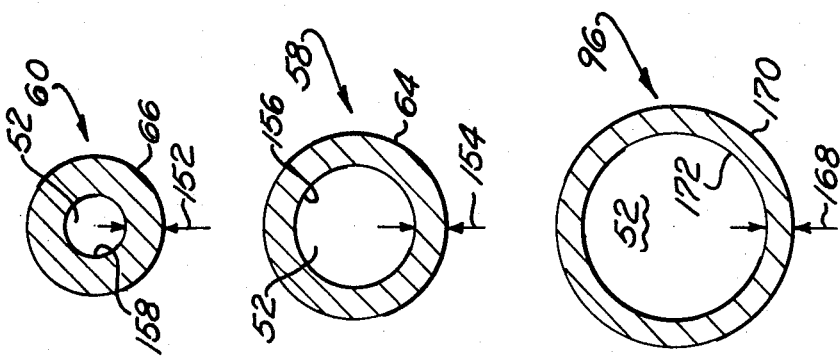
INVENTOR
OTTO V. PUZIK
BY Yount and Tarolli
ATTORNEYS

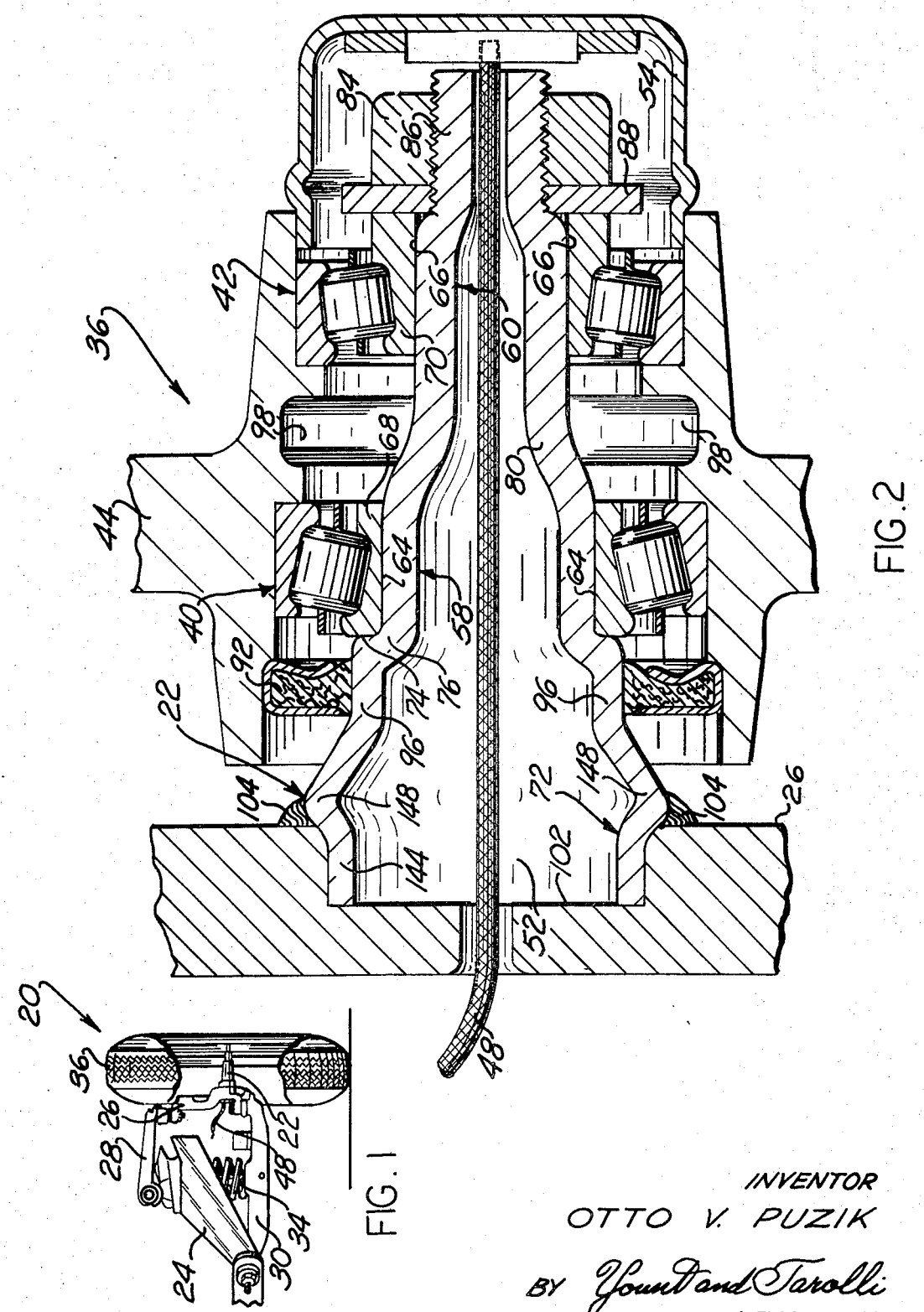

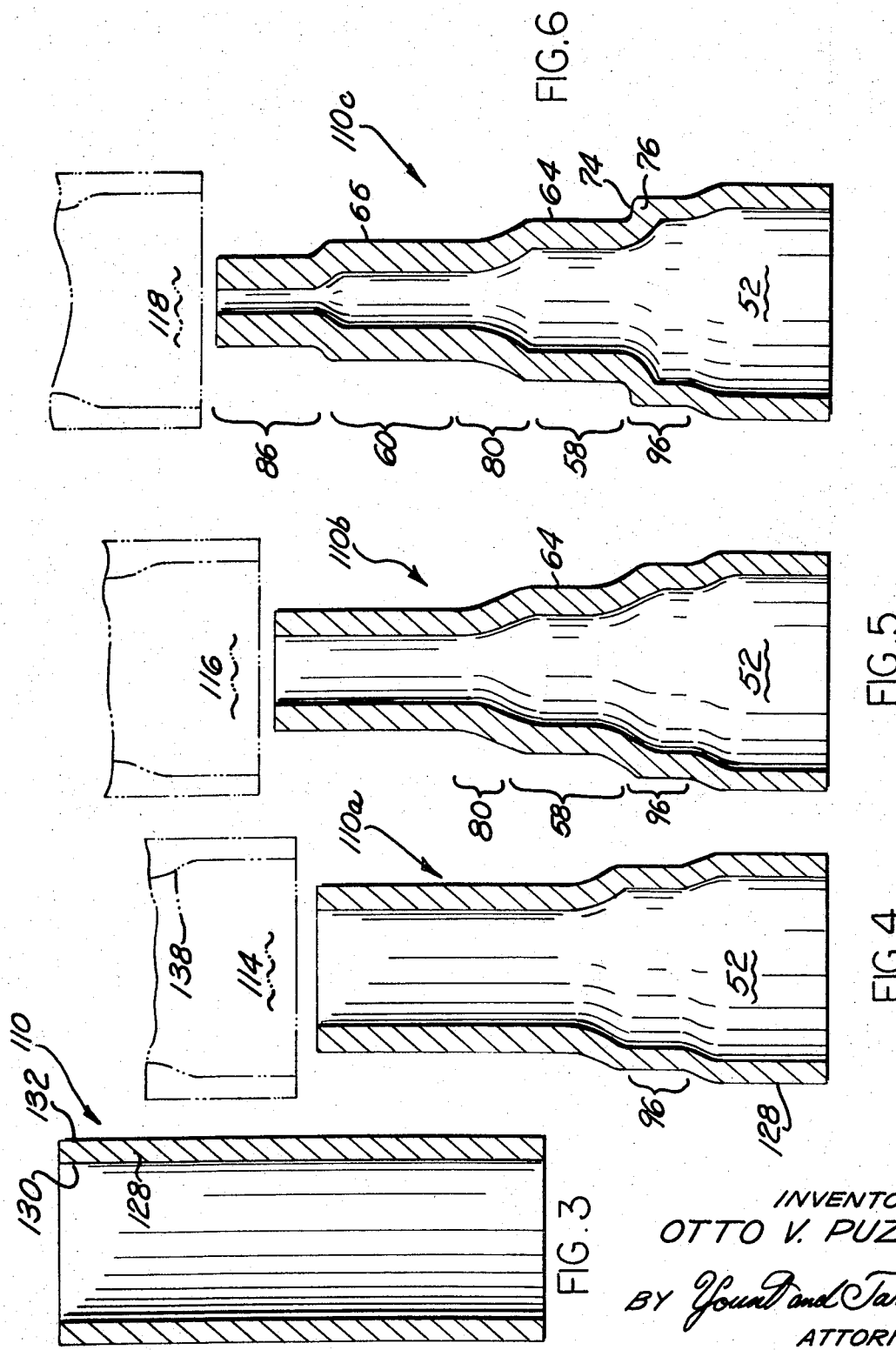

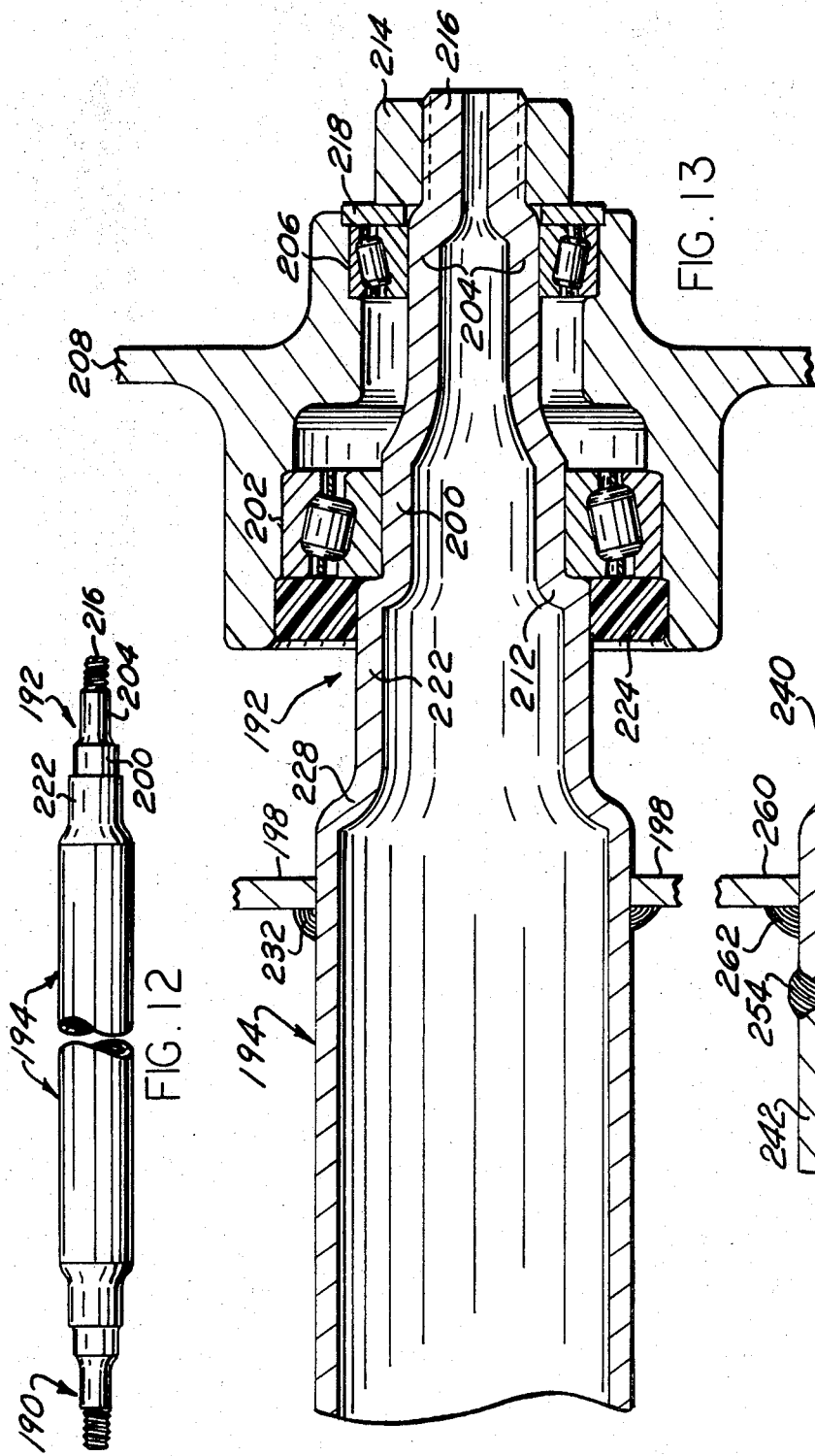

United States Patent Office 3,701,564
Patented Oct. 31, 1972

3,701,564
VEHICLE AXLE SPINDLE
Otto V. Puzik, Willoughby, Ohio, assignor to Willow Hill Industries, Inc., Willoughby, Ohio
Filed July 28, 1970, Ser. No. 58,950
Int. Cl. B21k 1/06
U.S. Cl. 301—131                    5 Claims

ABSTRACT OF THE DISCLOSURE

A hollow axle spindle for a vehicle is formed with an axially extending cavity by cold working a tubular blank. During this cold working process, dies are utilized to reduce the external diameter of a portion of the tubular blank to form an inner bearing support section. An outer bearing support section is formed by further reducing the external diameter of an outer portion of the tubular blank. The inner bearing support section is subjected to relatively large operating stresses and has a greater wall thickness than a base section of the spindle. A radially extending shoulder is provided between the base section and inner bearing support section to position an inner bearing assembly relative to the spindle. In one embodiment of the invention, a pair of hollow spindles are integrally formed with a common axle.

The present invention relates to a new and improved axle spindle and method of making the spindle.

Many vehicles, such as cars and trailers, have axle spindles for supporting their wheels. These axle spindles are commonly formed of a solid piece of forged metal which is machined to accurately form bearing support surfaces. The cost of machining an axle spindle is increased when a passage must be bored through the solid spindle to receive either a speedometer cable and/or speed sensor cable of an anti-skid system. Of course, the relatively heavy weight of a solid axle spindle contributes to the unsprung weight of a vehicle.

Accordingly, it is an object of this invention to provide a new and improved axle spindle which is hollow and is economically formed by cold working a tubular blank.

Another object of this invention is to provide new and improved axle spindles which are hollow and are integrally with a common axle by cold working opposite end portions of a tubular blank.

Another object of this invention is to provide a new and improved axle spindle which is hollow to minimize the weight of the spindle and to provide an axially extending passage to facilitate the installation in a vehicle of equipment requiring the extension through the spindle of a cable or other conductor.

Another object of this invention is to provide a new and improved method of forming a hollow axle spindle by cold working a tubular metal blank.

Another object of this invention is to provide a new and improved method of forming a hollow axle spindle for use in supporting a vehicle wheel which is to be rotatably mounted on the spindle by a pair of bearing assemblies which are to be located an an axially spaced apart relationship and wherein the method includes the steps of providing a hollow metal blank having an axially extending tubular wall, cold working the metal of the tubular wall to form a first bearing support section with an outer surface adapted to engage one of the bearing assemblies, and cold working the metal of the tubular wall to form a second bearing support section having an outer surface which is adapted to engage another of the bearing assemblies.

Another object of this invention is to provide a new and improved method of forming a hollow axle spindle for use in supporting a vehicle wheel which is rotatably mounted on the spindle by a plurality of bearing assemblies and wherein the method includes the steps of providing a metal blank which has a tubular wall, plastically deforming the metal of the tubular wall at a temperature below the crystallization temperature of the metal to form first and second axially spaced bearing support sections, operatively connecting the spindle with the frame of a vehicle, mounting bearing assemblies on the first and second bearing support sections, and rotatably supporting a wheel of the vehicle with the bearing assemblies.

These and other objects and features of the invention will become more apparent upon a consideration of the following description taken in connection with the accompanying drawings wherein:

FIG. 1 is a schematic illustration of a portion of the front suspension system of a vehicle;

FIG. 2 is an enlarged fragmentary view of a portion of the vehicle suspension system of FIG. 1 and illustrating the relationship between a wheel hub, wheel bearing assemblies, and a hollow axle spindle constructed in accordance with the present invention;

FIG. 3 is a sectional view, on a somewhat reduced scale, of a tubular blank from which the hollow axle spindle of FIG. 2 is formed by a cold working process;

FIG. 4 is a schematic sectional view illustrating the tubular blank of FIG. 3 after it has been cold worked to form a grease seal section the blank;

FIG. 5 is a schematic sectional view illustrating the blank of FIG. 4 after it has been cold worked to form an inner bearing support section;

FIG. 6 is a schematic sectional view of the tubular blank of FIG. 5 after it has been cold worked to form an outer bearing support section and outer end portion;

FIG. 7 is a schematic view illustrating the blank of FIG. 6 after an inner end portion of the blank has been expanded to form a base section;

FIG. 8 is a schematic sectional view of the blank of FIG. 7 after the base section has been cold worked to form a mounting section;

FIG. 9 is a sectional view, taken generally along the line 9—9 of FIG. 8, further illustrating the construction of the outer bearing support section;

FIG. 10 is a sectional view, taken along the line 10—10 of FIG. 8, further illustrating the construction of the inner bearing support section;

FIG. 11 is a sectional view, taken along the line 11—11 of FIG. 8, further illustrating the construction of the grease seal section;

FIG. 12 is a partially broken away illustration, taken on a reduced scale, of an axle which is integrally formed with a pair of hollow spindles;

FIG. 13 is a sectional view, on an enlarged scale, further illustrating the axle and one of the spindles of FIG. 12, the axle and spindle being shown in association with a trailer; and FIG. 14 is a fragmentary sectional view of a hollow axle spindle, similar to the axle spindle of FIG. 4, which is formed separately from an associated axle tube.

A front suspension system 20 (FIG. 1) of a vehicle includes a hollow axle spindle 22 constructed in accordance with the present invention. The general arrangement of the front suspension system 20 is, per se, known and includes an axle 24 which is connected with a steering knuckle 26 by upper and lower control arms 28 and 30. A coil spring 34 is provided between the lower control arm 30 and the axle 24. A wheel 36 is rotatably mounted on the spindle 22 in a known manner by an inner or main wheel bearing assembly 40 (FIG. 2) and an outrigger or outer wheel bearing assembly 42.

The spindle 22 is shown in FIG. 2 in association with a speedometer cable 48 which extends through a central cavity 52 in the hollow spindle into operative engagement with a grease cap 54 which rotates with the hub 44 of the wheel 36. The speedometer cable 48 drives a speedometer (not shown) of the vehicle in a known manner at a speed which is directly proportional to the speed of rotation of the grease cap 54 and wheel 36. Of course, the axially extending cavity 52 provides a convenient passage for conductors other than the speedometer cable 48. For example, when the axle spindle 22 is associated with either a rear or front wheel of a vehicle, conductors for a speed sensor of an anti-skid system can be extended through the hollow spindle and operatively connected with the wheel to enable the associated anti-skid apparatus to detect an impending locking up or skidding of the wheel.

The hollow axle spindle 22 includes an inner bearing support section 58 upon which the main or inner bearing assembly 40 is mounted and an outer bearing support section 60 upon which the axially outer bearing assembly 42 is mounted. The inner and outer bearing support sections 58 and 60 are coaxial and have cylindrical outer surfaces 64 and 66 which have an interference fit with cylindrical inner surfaces on inner races 68 and 70 (FIG. 2) of the bearing assemblies 40 and 42. Under normal operating conditions, the inner bearing support section 58 is subjected to greater operating stresses than is a base section 72 of the spindle 22. Therefore, the inner bearing support section 58 advantageously has a greater wall thickness than does the base section 72.

The inner bearing assembly 40 is positioned axially relative to the spindle 22 by engagement of an inner end portion of the bearing assembly with a generally radially projecting surface 74 of a bearing positioning shoulder 76. The inner bearing support section 58 has a larger external diameter than does the outer bearing support section 60 and is connected with the outer bearing support section by a radially inwardly and axially outwardly tapering connecting section 80. A bearing nut 84 engages a threaded outer end portion 86 of the spindle 22 and presses a washer 88 against the bearing assembly 42 to retain the bearing assembly 42 against axially outward movement relative to the spindle 22. Thus, the inner and outer bearing assemblies 40 and 42 are positioned relative to the spindle 22 by engagement of the inner bearing assembly 40 with the positioning shoulder 76 and by engagement of the outer bearing assembly 42 with the wheel hub 44 and the washer 88 and nut 84. It is contemplated that in certain embodiments of the invention the positioning shoulder 76 may be omitted and the inner bearing assembly positioned axially relative to the spindle 22 by engagement with the steering knuckle 26.

A known grease seal 92 extends between the hub 44 and a grease seal section 96 of the spindle 22. The grease seal 92 seals the annular opening between the spindle 22 and the interior of the hub 44 to prevent grease from leaving a grease chamber 98 between the hub 44 and spindle 22 and to keep dust from entering the grease chamber. Since the inner bearing support section 58 is normally subjected to greater operating stresses than the grease seal section 96, the inner bearing support section advantageously has a greater wall thickness than does the grease seal section.

The base section 72 has an interference fit with a cylindrical cavity 102 in the steering knuckle 26. An annular weld 104 circumscribes the circular base section 72 to securely interconnect the spindle 22 and steering knuckle 26. Of course, the spindle 22 could be fixedly connected to the steering knuckle 26 in a manner other than the specific manner illustrated in FIG. 2.

Since the axle spindle 22 is hollow, the weight of the spindle is substantially less than the weight of a similar solid axle spindle which has heretofore been commonly utilized on automobiles and other vehicles. The relatively low weight of the hollow axle spindle 22 tends to minimize the unsprung weight of a vehicle with which the axle spindle is associated. In one specific embodiment of the invention a hollow axle spindle, similar to the axle spindle 22, weighed approximately one half as much as did a solid axle spindle of a similar size and configuration. In addition, the provision of the cavity 52 in the hollow spindle 22 enables a speedometer cable 48 or other conductor to be operatively connected with the wheel 36 without incurring the expense of boring or drilling an axially extending passage through the spindle. It should be noted that when the hollow spindle 22 is utilized in association with a vehicle wherein a speedometer cable or similar conductor is not to be extended through the hollow spindle, the outer end of the cavity 52 could be blocked if desired.

In accordance with a feature of the present invention, the hollow axle spindle 22 is economically made by cold working or forming a tubular blank 110 (see FIG. 3) with a plurality of dies 114–122 in the manner illustrated schematically in FIGS. 4 through 8. Prior to beginning cold forming operations, the hollow blank 110 is positioned on an upstanding stake or support member in a known metal working press. The upstanding stake (not shown) has an external configuration which is generally similar to the surface of the cavity 52 in the hollow spindle 22. The press is then operated in a known manner to sequentially move a plurality of dies relative to the blank 110. Representative dies 114–122 are shown schematically in FIGS. 4–8.

As each of the dies 114–118 engages the blank 110 in turn, the metal of the blank is forced through an opening in the die to plastically deform the metal at a temperature below its crystallization temperature. While the blank 110 is being cold worked in this manner, the cylindrical outer surfaces 64 and 66 of the bearing support sections are precisely formed within the relatively small tolerance range and surface finish required to provide an interference fit with the inner races 68 and 70 (FIG. 2) of the bearing assemblies 40 and 42. Therefore, the surfaces 64 and 66 do not have to be precisely formed by machining operations as has heretofore been a common commercial practice. In addition, the cold working of the metal of the blank 110 results in a strain hardening and impartation of directional properties to the metal with a resulting increase in the structural strength of the spindle 22.

The tubular blank 110 (FIG. 3) has an annular wall 128 of uniform thickness and which is defined by cylindrical inner and outer surfaces 130 and 132 which are disposed in a coaxial relationship with each other. The tubular wall 128 has a length which is somewhat shorter than the length of the spindle 22 since the cold working of the blank 110 results in some axial growth of the blank. The tubular wall 128 has an external diameter which is somewhat less than the external diameter of the base 72 of the spindle 22 since the tubular wall 128 is expanded somewhat (see FIG. 7) to form the base 72. However, it should be understood that the blank 110 could be cold worked in such a manner as to form the base 72 without expanding the tubular wall 128.

The die 114 (FIG. 4) defines a central passage or opening 138 which has a circular cross-sectional configuration and an axially extending surface configuration corresponding to the shape of the cold worked blank 110a shown in FIG. 4. The cylindrical blank 110 of FIG. 3 is cold worked to form the blank 110a by first moving the die 114 into axial alignment with the blank 110 and then moving the die axially downwardly along the blank. This movement results in the tubular wall 128 of the blank 110 being plastically deformed radially inwardly at a temperature below the crystallization temperature of the metal to form the blank 110a. It should be noted that the grease seal section 96 is partially formed by this movement of the die 114.

The die 114 is then raised clear of the blank 110a and the blank is indexed to a position in which it is in axial alignment with the die 116. The die 116 is then axially lowered to cold work the blank 110a and thereby form the blank 110b of FIG. 5. It should be noted that this movement of the die 116 initiates the formation of the inner bearing support section 58 and the tapering connector section 80 which are coaxial with the grease seal section 96. Considerable strain hardening will have occurred by this time in the blank 110b. Therefore, the blank 110b is advantageously annealed before continuing with the cold forming operation.

The annealed blank 110b is then moved into axial alignment with the die 118 which is telescoped axially with the blank 110b to form the blank 110c shown in FIG. 6. The upper portion of the blank 110c has a configuration corresponding to the configuration of the spindle 22. Thus, the die 118 forms the final configuration for the bearing positioning shoulder 76 and the coaxial bearing support sections 58 and 60. In addition, the die 118 forms the outer end portion 86 on which threads are subsequently rolled to enable the bearing nut 84 to be threaded onto the spindle 22.

Once the upper or outer portion of the blank 110c has been formed, the bottom or inner portion of the blank 110c is cold worked to form the base section 72 which is coaxial with the other sections of the spindle 22. Thus, the blank 110c is moved into axial alignment with the expanding die 120 which is pressed into the lower end portion of the blank 110c. This expands the tubular wall of the blank 110c radially outwardly to form the blank 110d (FIG. 7). A mounting section 144 is then formed on the base 72 by compressing the base inwardly in a manner shown schematically in FIG. 8 with the die 122. The mounting section 144 is received in the cavity 102 of the steering knuckle 26 (FIG. 2) and advantageously includes a shoulder 148 for positioning the spindle 22 relative to the steering knuckle.

The cold working of the blank 110 to form the spindle 22 is completed once the mounting section 144 has been formed on the base 72 by the die 122. However, threads must still be rolled, in a known manner, on the outer end portion 86 of the spindle. It should be understood that the base 72 could, if desired, be formed by reducing the diameter of a blank having a relatively large diameter rather than by expanding the blank. However, by reducing the diameter of the blank 110 to form the bearing support sections 58 and 60 and expanding the blank 110 to form the base section 72, the extent of movement of the metal of the blank in a radially inward direction and in a radially outward direction tends to be minimized.

By varying the shape of the openings 138 in the dies 114 through 118, the shape of the spindle 22 can be varied. Thus, the opening 138 could be shaped in such a manner as to provide the cylindrical bearing support sections 58 and 60 with either an inwardly projecting slot or an outwardly projecting protuberance to assist in retaining the inner races 68 and 70 of the bearing assemblies 40 and 42 against movement relative to the spindle 22. Of course, the specific illustrated configuration of the spindle 22 could be varied to suit the particular requirements of a vehicle with which the spindle 22 is to be associated. In addition, the cold working process could, if desired, be performed by moving the blank 110 relative to the dies 114–122 rather than by moving the dies relative to the blank.

It should be understood that the sequence of cold working steps shown in FIGS. 4 through 8 are merely representative of the steps which are performed during the cold working operation. The specific number of dies and steps required to form the spindle 22 from a hollow blank 110 will vary depending upon the metal from which the blank is made and the physical size and configuration of the spindle 22. In one specific preferred embodiment of the invention, the blank 110 was formed of SAE 1010 steel tubing. This specific blank was shaped by a relatively large number of dies having metal forming surfaces which differed by a lesser extent relative to each other than do the surfaces 138 of the dies 114–122.

During the cold forming operation illustrated schematically in FIGS. 4 through 8, the metal of the tubular wall 128 of the blank 110 (FIG. 3) is plastically deformed either radially inwardly or outwardly at a temperature below the crystallization temperature of the metal to form the various sections of the spindle 22. While a small portion of this metal is displaced axially and results in an axial growth of the blank 110, most of the metal of the tubular wall 128 is moved in a radial direction. Therefore, the metal area measured on a radial plane extending through the wall 128 of the blank 110 (FIG. 3) is substantially equal to the metal area measured on a radial plane through the various sections of spindle 22.

Since the wall of the spindle 22 has an annular cross sectional configuration with a constant metal area at the various sections of the spindle, the radial thickness of the annular wall of the spindle decreases as the external diameter of the wall increases. This is perhaps best seen by a comparison of the cross sectional configurations of the inner and outer bearing support sections 58 and 60. The outer bearing support section 60 has a relatively small diameter and a relatively large wall thickness, designated 152 in FIG. 9. The inner bearing support section 58 has a large external diameter than does the outer bearing support section 60 and has a smaller wall thickness, indicated at 154 in FIG. 10. The thickness 152 of the outer bearing support section 60 is sufficiently greater than the thickness 154 of the inner bearing support section 58 so that the metal area between a cylindrical inner surface 158 and outer surface 66 of the outer bearing support section 60 is approximately equal to the metal area between a cylindrical inner surface 156 and the cylindrical outer surface 64 of the inner bearing support section 58.

Similarly, the outer end portion 86 of the spindle 22 has a relatively small diameter and a relatively large metal thickness between its cylindrical inner and outer surfaces 162 and 164 (see FIGS. 7 and 8). Since the grease seal section 96 has a larger diameter than does the inner bearing support section 68 (see FIGS. 10 and 11), the radial thickness 168 of the grease seal section 96 is less than the radial thickness 154 of the inner bearing support section 68. However, the metal area between the cylindrical outer surface 170 and inner surface 172 of the grease seal section 96 is approximately equal to the metal surface areas on radial planes through the inner and outer bearing support sections 58 and 60. As was previously mentioned, the relatively thick wall section of the inner bearing support section 58 compared to the grease seal section 96 tends to strengthen the spindle 22 at the junction between these two sections where a relatively large stress is applied to the spindle 22 by the inner or main bearing assembly 40.

Although the axle spindle 22 has been illustrated in FIG. 2 as being formed separately from the axle 24 (FIG. 1) of the vehicle 20, it is contemplated that in certain types of vehicles the spindle and axle could advantageously be integrally formed from a single tubular metal blank. Of course, this would eliminate the necessity of connecting a separate spindle to an axle and would reduce the cost of assembling the vehicle. This construction is illustrated in FIG. 12 wherein a pair of identical spindles 190 and 192 are integrally formed with a common axle 194. Although this specific combination axle and spindle construction can advantageously be used with many different types of vehicles, it is contemplated that this construction will be particularly advantageous in association with house trailers and similar types of wheeled vehicles. Of course, the length of the axle 194 will depend upon the distance to be provided between the wheels of the associated vehicle.

The spindle 192 is illustrated in FIG. 13 in association with a brake support plate 198 of a house trailer. The spindle 192 includes an inner bearing section 200 on which an inner or main bearing assembly 202 is mounted. An outer bearing section 204 is coaxial with the inner bearing section 200 and supports an outer bearing assembly 206. A hub 208 of a wheel is rotatably supported on the spindle 192 by the bearing assemblies 202 and 206. Of course, another wheel (not shown) is supported in the same manner on the opposite spindle 190.

The inner bearing assembly 202 is positioned axially relative to the spindle 192 by a radially projecting shoulder section 212. A bearing nut 214 is mounted in threaded engagement with an outer end portion 216 of the spindle 192 and presses a washer 218 against the outer bearing assembly 206 to retain the wheel hub 208 on the spindle 192. A grease seal section 222 on the spindle 192 is engaged by a seal 224 mounted on the hub 208. The spindle 192 is joined with the axle 194 by a radially inwardly and axially outwardly tapering shoulder section 228. The brake support plate 198 is welded to the axle 194 just inwardly of the shoulder section 228.

The spindles 190 and 192 are integrally formed with the axle 194 by cold working opposite ends portions of a tubular blank (not shown) having a diameter equal to the external diameter of the axle and an overall length which is substantially the same as the combined length of the axle and the two spindles. Since it is contemplated that identical wheel hubs will probably be associated with the spindles 190 and 192, the inner bearing support section of the spindle 190 is coaxial with and has the same configuration as the inner bearing support section 200 of the spindle 192. Similarly, the outer bearing section of the spindle 190 is coaxial with and has the same configuration as the outer bearing section 104 of the spindle 192. However, it should be understood that the spindles 190 and 192 could have different configurations and could be axially offset relative to each other if desired.

The cold working process by which the spindles 190 and 192 are formed is substantially the same as the cold working process illustrated schematically in FIGS. 3 through 6 in association with the blank 110. Thus, one end portion of a relatively long cylindrical blank having a uniform annular cross sectional configuration is aligned with a central passage or opening in a die, similar to the die 114 of FIG. 4, which is moved axially along the blank to plastically deform the wall of the blank radially inwardly at a temperature below the crystallization temperature of the metal of the blank. The outer end portion of the blank will then be further cold worked to form the bearing support sections 200 and 204 and the outer end portion 216. It should be noted that the wall thickness of the spindle 192 increase as the diameter of the wall decreases in much the same manner as previously explained in connection with the blank 110. Thus, the wall of the axle 194 is somewhat thinner than the wall of the inner bearing section 200.

Once the spindle 192 has been formed, the opposite end portions of the blank will be cold worked in the same manner to form the grease seal, bearing sections, and outer end portion of the spindle 190. Of course, the two spindles 190 and 192 could, if desired, be simultaneously formed by cold working the opposite end portions of the blank at the same time. When the spindles 190 and 192 are to be associated with certain types of vehicles, it is contemplated that each spindle will be integrally formed with a separte axle member.

Once the two spindles 190 and 192 have been integrally formed with the axle 194, the axle and spindles can be readily mounted on a vehicle in any suitable manner, such as by welding known mounting blocks or pads onto the axle. In addition, an annular weld 232 is formed between the axle 194 and the brake support plate 198. Of course, a similar weld is formed between the axle 194 and another brake support plate which is located adjacent to the spindle 190. Since the spindles 190 and 192 are integrally formed with the axle 194, separate connections do not have to be made between the spindles and the axle. The omission of the joints between the spindles 190 and 192 in the axle 194 tends to minimize stress concentrations and the possibility of structural failures during operation of the vehicle. If desired, an opening could be formed in the tubular wall of the axle 194 to enable suitable wires or leads to be run through the axle to the hollow spindles 190 and 192 to effect activation of an electric brake assembly for retarding rotation of a wheel of the trailer. Of course, these leads could be associated with equipment other than an electric brake assembly.

While the integral axle and spindle arrangement shown in FIGS. 12 and 13 will be particularly advantageous in certain types of vehicles, it is contemplated that in other types of vehicles it will be advantageous to form the spindles separately from a tubular axle and then connect the spindles to the tubular axle. This arrangement is shown in FIG. 14 wherein a hollow spindle 240 is shown in association with a tubular axle 242 of a vehicle. The hollow spindle 240 has a grease seal section 246 which is substantially the same as the grease seal section 222 of the spindle 192 (FIG. 13). In addition, the hollow spindle 240 includes inner and outer bearing sections and an outer end portion (not shown) which are of the same construction as the inner and outer bearing sections 200 and 204 and outer end portion 216 of the hollow spindle 192 (FIG. 13). However, the hollow spindle 240 includes a base section 250 which is reduced at an axially outer end portion to form a mounting section 252.

During assembly of an associated vehicle, the mounting section 252 is telescopically disposed with the axle tube 242. An annular weld 254 is then formed between the axle tube 242 and hollow spindle 240 so that they are fixedly interconnected. The axle tube 242 and brake support plate 260 are interconnected with an annular weld 262 in much the same manner as in which the axle 194 is connected to the brake support plate 198 by the annular weld 232 (FIG. 13).

From the foregoing description it can be seen that a hollow axle spindle can be economically formed by plastically deforming a tubular metal blank at a temperature below the crystallization temperature of the metal of the blank. During this cold working process, bearing support sections are formed with sufficient dimensional accuracy and surface finish to enable the spindle to be used without machining the bearing support sections. Since the resulting axle spindle is hollow, its relatively light weight tends to minimize the unsprung weight of a vehicle with which it is associated. In addition, the axially extending cavities within the hollow spindles facilitate the installation of vehicle equipment requiring the extension through the spindle of a cable or other conductor. If desired, the hollow spindle can be integrally formed with the axle of a vehicle.

Having described specific preferred embodiments of the invention, the following is claimed:

1. A method of forming a hollow axle spindle for use in supporting a vehicle wheel which is rotatably mounted on the spindle by a plurality of bearing assemblies located in axially spaced apart relationship between an outer end portion of the spindle and an inner end portion of the spindle which is connected with the vehicle, said method comprising the steps of: providing a metal blank of approximately the same length as the axle spindle and which has an axially extending tubular wall having open ends and a generally uniform external diameter with an annular cross-sectional configuration in a radially extending plane; providing an outwardly extending support stake having the same general external configuration as the internal configuration of the hollow axle spindle with a first portion having a relatively large cross-sectional area, an intermediate portion of smaller cross-sectional area than said first portion, and an outer portion of smaller cross-sectional area than said intermediate portion; positioning the blank on the stake with one end portion of the blank adjacent to the first portion of the stake; providing a plurality of dies; cold forging at least a portion of the metal of the tubular wall adjacent to the first and intermediate portions of the stake at a temperature below the crystallization temperature of the metal of the blank by moving at least one of the dies axially relative to the blank and stake, said step of cold forging the tubular wall of the blank with at least a first one of the plurality of dies including the method step of forming adjacent to the first portion of the stake the mounting end portion of the spindle which is to be connected with a vehicle and of forming adjacent to the intermediate portion of the stake a first cylindrical bearing support section having substantially cylindrical inner and outer surfaces which extend substantially parallel to each other in a co-axial relationship with longitudinal axis of the blank and are uniformly spaced from each other by a first distance; cold forging at least a portion of the metal of the tubular wall with at least a second one of the plurality of dies at a location which is axially outwardly of the first bearing support section and at a temperature which is below the crystallization temperature of the metal of the blank, said step of cold forging the tubular wall of the blank with at least a second one of the plurality of dies including the method step of forming adjacent to the outer end portion of the stake a second cylindrical bearing support section having a smaller external diameter than the first cylindrical bearing support section and having substantially cylindrical inner and outer surfaces which extend substantially parallel to each other in a co-axial relationship with the first bearing support section and are uniformly spaced from each other by a second distance which is greater than the first distance between the inner and outer surfaces of the first cylindrical bearing support section to thereby form the second cylindrical bearing support section with a greater metal thickness in a radial direction than the first bearing support section, and removing the cold forged blank from the stake after performing the foregoing steps.

2. A method of forming a hollow axle spindle as set forth in claim 1 further including the method step of cold forging said one end portion of the blank at a temperature below the crystallization temperature of the metal of the blank, said step of cold forging said one end portion of the blank including the step of expanding said one end portion of the blank radially outwardly to further form the mounting end portion of the spindle.

3. A method as set forth in claim 1 further including the method step of cold forging said one end portion of the blank at a temperature below the crystallization temperature of the blank, said step of cold forging said one end portion of the blank including the step of contracting said one end portion of the blank radially inwardly to form a positioning shoulder on the mounting end portion of said spindle.

4. A method of forming a hollow axle spindle as set forth in claim 1 further comprising the method steps of plastically deforming at least a portion of the metal of the tubular wall of the blank with at least a third one of the plurality of dies at a temperature which is below the crystallization temperature of the metal of the blank, said step of plastically deforming the tubular wall of the blank with at least a third one of the plurality of dies including the method steps of forming a bearing positioning shoulder adjacent an axially innermost end portion of the first bearing support section with a base section extending axially inwardly therefrom and having inner and outer surfaces in a co-axial relationship with the first bearing support section and uniformly spaced from each other by a third distance which is less than the first and second bearing support sections to thereby form the base section with a metal thickness which is less than the metal thickness of the first and second bearing support sections.

5. An assembly comprising a support member connected to a vehicle and defining a spindle receiving opening, a hollow metal axle spindle means extending into the spindle receiving opening defined by said support member for use in supporting a vehicle wheel to be rotatably mounted on the spindle means by a plurality of bearing assemblies which are to be located in an axially spaced apart relationship, said spindle means including an inner bearing support section having a cylindrical outer surface adapted to engage one of the bearing assemblies and a substantially cylindrical inner surface which partially defines a longitudinally extending cavity within said spindle means, said inner and outer surfaces of said first bearing support section at least partially defining a first annular wall portion of a first thickness, an outer bearing support section located axially outwardly of said inner bearing support section and having a cylindrical outer surface adapted to engage another of the bearing assemblies and a substantially cylindrical inner surface which further defines the longitudinally extending cavity within said spindle means, said inner and outer surfaces of said second bearing support section being disposed in a co-axial relationship with said inner and outer surfaces of said first bearing support section and at least partially defining a second annular wall portion having an external diameter which is less than the external diameter of said first annular wall portion and has a second thickness which is greater than the thickness of said first annular wall portion so that the wall of said second bearing support section is thicker than the wall of said first bearing support section, a radially projecting bearing positioning shoulder located at an axially innermost end portion of said inner bearing support section for limiting axial movement of the one bearing assembly relative to said spindle means, and a mounting section located axially inwardy of said bearing positioning shoulder for engaging said support member, said mounting section including a cylindrical end section disposed in the opening in said support member and a radially projecting spindle positioning shoulder located axially outwardly of said end section and disposed adjacent to a surface of said support member which extends transversely to the longitudinal axis of said spindle means to position said spindle means relative to said support member, and fastening means for interconnecting said spindle positioning shoulder and said support member.

References Cited

UNITED STATES PATENTS

| | | | |
|---|---|---|---|
| 3,465,418 | 9/1969 | Clark et al. | 29—477 |
| 3,037,818 | 6/1962 | Scheel | 301—124 |
| 2,818,244 | 12/1957 | Ropar | 73—493 |
| 2,165,472 | 7/1939 | Friedman | 72—377 |
| 2,133,091 | 10/1938 | Gettig | 72—377 |

FOREIGN PATENTS

| | | | |
|---|---|---|---|
| 231,853 | 4/1959 | Australia | 301—124 |

LOWELL A. LARSON, Primary Examiner

U.S. Cl. X.R.

72—307, 377